2,889,251
PRODUCTION OF NON-TURBID BACITRACIN SOLUTIONS

Herbert M. Gross, Waukegan, Ill., assignor to Commercial Solvents Corporation, Terre Haute, Ind., a corporation of Maryland No Drawing. Application August 23, 1956
Serial No. 605,701

4 Claims. (Cl. 167—65)

My invention relates to the antibiotic bacitracin, and more particularly, it relates to a process for production of non-turbid solutions of bacitracin.

Bacitracin is produced by the organism *Bacillus subtilis* (Tracy 1) when grown in various liquid nutrient media. This antibiotic was first reported by Johnson, Ankar and Meleney in 1945 (Science, volume 102, page 376). Bacitracin is a neutral, water-soluble substance which resists digestion by pepsin or trypsin and is believed to have the structure of a polypeptide, although this has not been conclusively shown.

The antibiotic material known as bacitracin is in reality a mixture of polypeptide materials. Various investigators have subjected different bacitracin materials to tests designed to separate the components. Craig et al., in Journal of Biological Chemistry, volume 199, page 259 (1952), subjected a bacitracin material to countercurrent distribution and separated 5 components identified as bacitracin A, bacitracin B, bacitracin D, bacitracin E, and bacitracin F. Newton et al., in Biochemical Journal, volume 53, page 597 (1953), using generally the same test separated a different bacitracin starting material into 10 components identified as bacitracins A, A', B, C, D, E, $F_1$, $F_2$, $F_3$ and G. Of these components bacitracin A (as obtained by both Craig et al. and Newton et al.) is the most prevalent and the most active from an antibiotic standpoint; however, it is not ordinarily obtained by the usual methods of recovery in the absence of at least some of the other components. For example, the bacitracin starting material of Craig et al. contained bacitracin A and four other components.

Bacitracin can be recovered from the nutrient media in which it is produced by any of various processes, the final step of which usually consists of drying a water-concentrate of bacitracin to give the final, dried bacitracin product. The bacitracin product so obtained is a dry, amorphous material which can be used in any desired manner such as in tablets, ointments, etc. or it can be reconstituted in aqueous solution for parenteral, nasal or ophthalmic use. When bacitracin is desired for paranteral use and is reconstituted in aqueous solution as indicated above, the aqueous solution generally has a pH of about 6.0. Upon standing or dilution, such aqueous solutions of bacitracin become cloudy or develop turbidity indicating the presence of insoluble substances or at least substances which become insoluble in the presence of water. The development of the turbidity is a distinct disadvantage in the use of bacitracin solutions parenterally since it can lead to clogging of the needle used for injection, deposits of insoluble substances in the body, etc., and is a distinct disadvantage in ophthalmic and nasal solutions in which clarity and freedom from particulate matter is a matter of necessity and pharmaceutical elegance.

I have now discovered a process for producing non-turbid bacitracin solutions which can be left standing at any reasonable temperature at which bacitracin is stable without developing cloudiness or turbidity. My new process is convenient, economical, and overcomes a disadvantage which has plagued the industry since parenteral and ophthalmic use of bacitracin first began.

My new process consists essentially of adjusting the pH of a substantially pure bacitracin solution to a value within the range 6.5–7.5, the pH adjustment being made prior to drying of an aqueous concentrate of bacitracin to obtain the dry, amorphous, substantially pure material or following reconstitution of the dry, amorphous, substantially pure bacitracin material in water. By substantially pure bacitracin, I mean bacitracin having a potency of at least about 50 units per milligram.

In carrying out my new process, I can adjust the pH of an aqueous concentrate of substantially pure bacitracin just prior to the drying of the aqueous concentrate to obtain dry, amorphous bacitracin. As indicated above, most processes for the recovery of dry, solid bacitracin employ, as the final step in the process, the drying of a water-concentrate of bacitracin to give the final, dried purified bacitracin product. In carrying out my new process, I merely adjust the pH of the final concentrate to a value within the range 6.5–7.5 and then dry the material to obtain the dry, amorphous bacitracin. Upon reconstitution in aqueous solution, the pH of the solution will be essentially the same as the pH of the final concentrate which was dried to obtain the dry, solid amorphous bacitracin. When such a procedure is employed, the reconstituted solution of bacitracin will not develop cloudiness or turbidity as to have bacitracin solutions in the past.

Alternatively, I can carry out my process by adjusting the pH of a reconstituted solution of dry, amorphous bacitracin in water to a value within the range 6.5–7.5 and in so doing prevent the development of cloudiness or turbidity in the reconstituted solution. In so carrying out my process, any of the prior processes for recovery of bacitracin by drying a water-concentrate of bacitracin, to give the final, dry bacitracin product can be followed. Upon reconstitution of this material in aqueous solution, the initial pH will be found to be in the range of approximately 5.5–6.0 and I then adjust the pH to a value within the range 6.5–7.5 to prevent the development of cloudiness or turbidity.

The pH adjustment of the aqueous solution of bacitracin can be carried out by any suitable means. I have found that I can adjust the pH with an alkali metal hydroxide or alkaline earth metal hydroxide or if the pH is above about 7.5, I can adjust the pH with a dilute solution of a mineral acid or organic acidic compound. The pH adjustment which is the essential feature of my new process, can be carried out by the use of ion exchange resin, i.e., the use of a suitably buffered anion exchange resin when the pH is below the desired range or a suitably buffered cation exchange resin when the starting pH is above the desired range.

The following examples are offered to illustrate my invention; however, I do not intend to be limited to the specific procedures, materials, or proportions set forth. Rather, I intend to include within the scope of my invention all equivalents obvious to those skilled in the art.

EXAMPLE I

Dry, amorphous bacitracin obtained by freeze-drying under vacuum a water-concentrate of bacitracin having a pH of 6.0 was dry-filled into vials in the amount of 1 gram per vial. The bacitracin in the vials was then dissolved in 33 ml. of distilled water, the pH was adjusted to varying levels and the samples stored for a 16-hour period, half of the samples under refrigeration and half of the samples at room temperature. The pH to which each sample of material was adjusted was unchanged after storage under either refrigeration or at room temperature. The results of the experiment are shown in the following table.

Table I

| pH of Solution | Appearance of Refrigerated Material | Appearance of Material at Room Temp. |
|---|---|---|
| 5.0 | Turbid | Turbid. |
| 5.6 | do | Do. |
| 6.0 | do | Do. |
| 6.2 | do | Do. |
| 6.4 | do | Do. |
| 6.8 | Clear | Clear. |
| 7.0 | do | Do. |

EXAMPLE II

A water-concentrate of bacitracin was divided into 100 ml. samples and the pH of the samples adjusted to varying levels. The samples were then freeze-dried under vacuum to obtain samples of dry, amorphous bacitracin. The dry bacitracin samples were then reconstituted in 60 ml. of distilled water, the pH determined and the samples then stored for four hours at 5° C. The results of the experiment are shown in the following table.

Table II

| Original pH | pH on Reconstitution | Appearance |
|---|---|---|
| 6.2 | 6.2 | Cloudy. |
| 6.5 | 6.5 | Clear. |
| 6.8 | 6.8 | Do. |
| 7.1 | 7.1 | Do. |
| 7.5 | 7.5 | Do. |

EXAMPLE III

A 400-ml. portion of an aqueous solution of bacitracin was passed through a bed of a mixture of cation exchange resin and anion exchange resin, the bed being washed and the washings added to the effluent to obtain 625 ml. of an aqueous solution of bacitracin containing 453 units of bacitracin per ml. A 200-ml. portion of the aqueous solution of bacitracin was then freeze-dried under vacuum to obtain 1.3 grams of dry, solid bacitracin assaying 52 units of bacitracin per ml. Upon reconstitution of the bacitracin in aqueous solution, a solution of pH 6.9 was obtained, which solution, upon storage, remained clear without developing cloudiness or turbidity.

This application is a continuation-in-part of my application Serial Number 467,649, filed on November 8, 1954, now abandoned.

Now having described my invention, what I claim is:

1. The method of producing bacitracin solutions which remain clear and non-turbid upon standing and which, if dried, upon reconstitution form solutions which remain non-turbid on standing which comprises adjusting to a pH of from about 6.5 to 7.5 a substantially pure aqueous solution of bacitracin which would form a solid bacitracin having a potency of at least about 50 units per milligram if dried.

2. The method of producing bacitracin for parenteral, nasal and ophthalmic use which yields clear solutions upon reconstitution and storage which comprises adjusting to a pH of from about 6.5 to 7.5 a substantially pure concentrated aqueous solution of bacitracin and drying the resulting concentrated solution to obtain dry, solid bacitracin material.

3. The process for the production of bacitracin aqueous solutions for parenteral, nasal and ophthalmic use which solutions remain clear and non-turbid upon storage which comprises dissolving substantially pure, amorphous bacitracin having a minimum concentration of about 50 units per milligram in water and adjusting the pH of the aqueous solution to a value within the range 6.5 to 7.5.

4. In a process for producing bacitracin for use in parenteral, nasal and ophthalmic solutions which remain clear and non-turbid on standing, the improvement which comprises adjusting the pH of a substantially pure concentrated aqueous solution of bacitracin to a value within the range 6.5–7.5 and drying the resulting concentrated solution to obtain dry, solid, amorphous bacitracin having a minimum concentration of about 50 units per milligram.

References Cited in the file of this patent

UNITED STATES PATENTS 2,582,921　　Charney　　Jan. 15, 1952

OTHER REFERENCES

Anker et al.: J. Bact., vol. 55, February 1948, pp. 249–255.

Craig et al.: J. Clin. Inv., 1949, pp. 1014–1017.

Newton et al.: The Biochem. J., vol. 47, No. 3, September 1950, pp. 257–267.

Newton et al.: The Biochem. J., March 1953, pp. 597–604.

"Bacitracin," pp. 19–21, pub. Res. Div. S.B. Peni Co., N.Y., 1952.

Welch et al.: "Principles and Practices of Antibiotic Therapy," pp. 146–148, pub. 1954, by Med. Encycl. Co.